Nov. 23, 1948.　　　　N. LESTER ET AL　　　　2,454,661
EXTRUSION MACHINE FOR PLASTIC MATERIAL
Filed May 17, 1945　　　　　　　　　　　3 Sheets-Sheet 1

INVENTORS.
Nathan Lester and
William H. Schwartz
BY
Oberlin & Limbach
ATTORNEYS

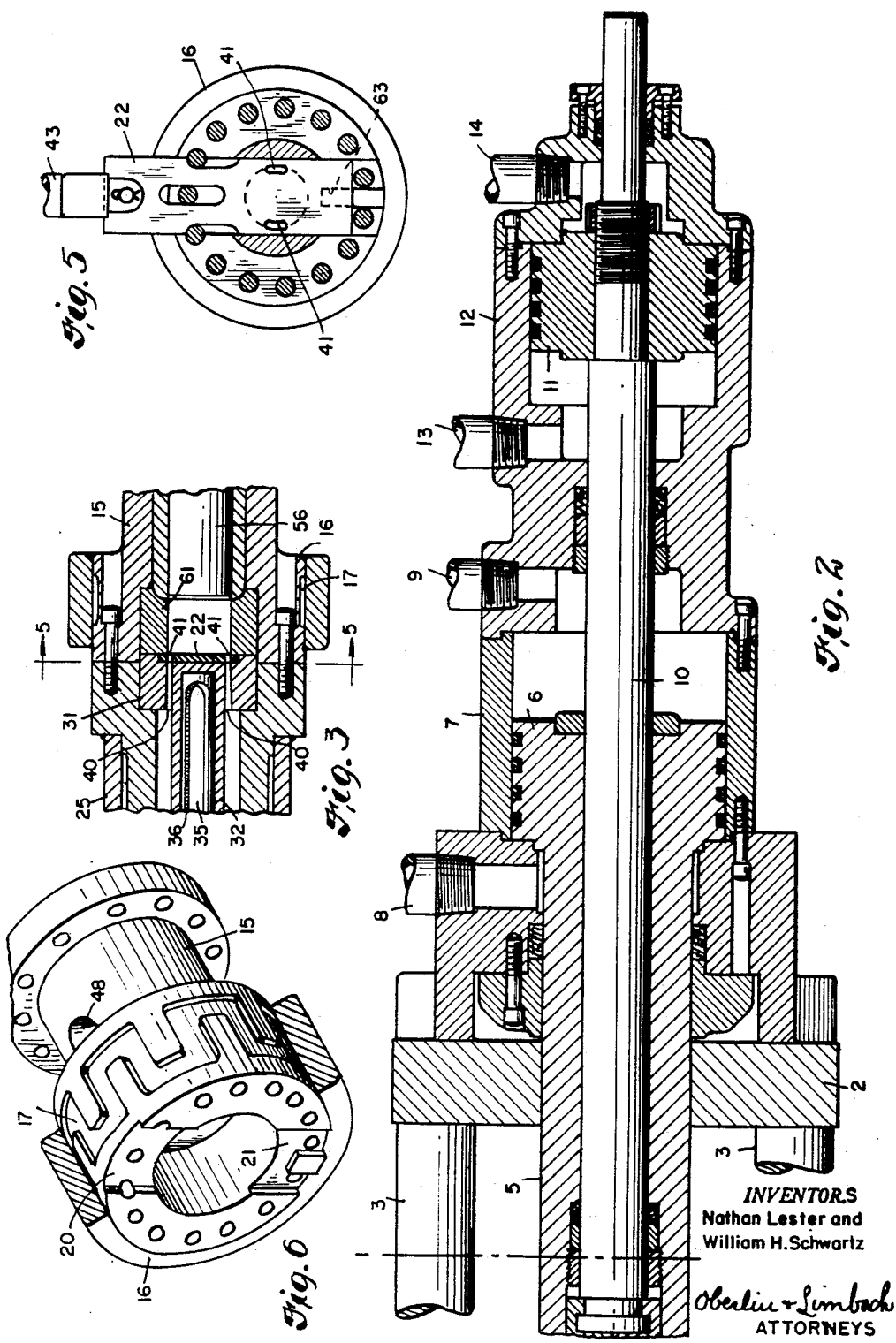

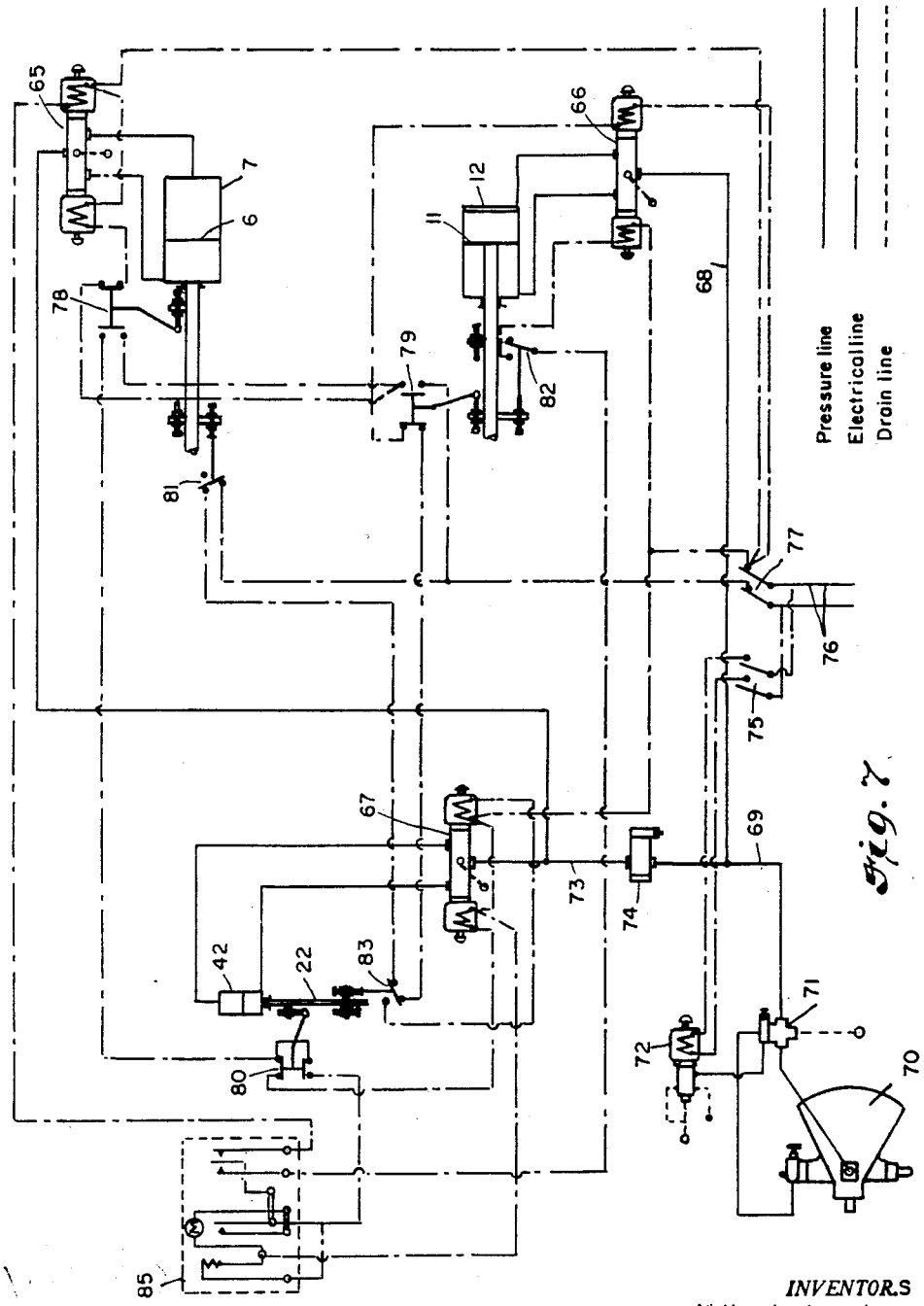

Patented Nov. 23, 1948

2,454,661

UNITED STATES PATENT OFFICE 2,454,661

EXTRUSION MACHINE FOR PLASTIC MATERIAL

Nathan Lester, Shaker Heights, and William H. Schwartz, Cleveland, Ohio, assignors to Lester Engineering Company, Cleveland, Ohio, a corporation of Ohio Application May 17, 1945, Serial No. 594,184

10 Claims. (Cl. 18—30)

The present improvements, relating as indicated to extrusion machines for plastic material, have more particular regard to a machine for supplying such material under pressure to a permanent mold or die, such a machine being known in the plastic molding art as of the injection molding type. Such material, whatever its particular composition, in its original state comes in powdered, granulated or otherwise finely divided, solid form and before it is introduced into the mold or die cavity under pressure it must be reduced to a softened or plastic mass by the application of heat. In the casting or molding of such material whether of thermo-plastic or thermosetting type, the control and uniformity of the application of heat before entry of the material into the mold, as well as the control of the pressure applied to the material at such time, are important factors in the production of high grade and satisfactory molded articles.

In certain respects the present machine may be regarded as an improvement on the plastic casting machine that forms the subject matter of U. S. Patent No. 2,243,968 issued to Nathan Lester under date of June 3, 1941.

One principal object of the present invention is to provide a machine of the character described which will be substantially automatic in operation, i. e. perform in proper sequence the cycle of operations involved in reducing the material to plastic form and then injecting the same to the proper temperature and under required pressure into the mold. A further object is to provide suitable controls so that the time intervals for the various steps may be varied to meet the requirements of the particular material being molded, the character of the mold, and other factors. Still another object is to provide a machine which will be simple and compact in construction and capable of being readily assembled and disassembled, as is desirable where working with a plastic material.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 2 is a similar view of the remainder of such machine, Figs. 1 and 2 providing a complete section thereof;

Fig. 3 is a section of a portion of the machine shown in Fig. 1 but taken at right angles to the plane thereof as indicated by the line 3—3;

Fig. 5 is a transverse section taken on the plane indicated by the lines 5—5 on Figs. 1 and 3;

Fig. 6 is a broken perspective view of that portion of the machine which is illustrated sectionally in Figs. 3 and 5; and Fig. 7 is a diagrammatic view showing the hydraulic circuits and wiring connections for the several operative parts of the machine.

Figures 1, 4:
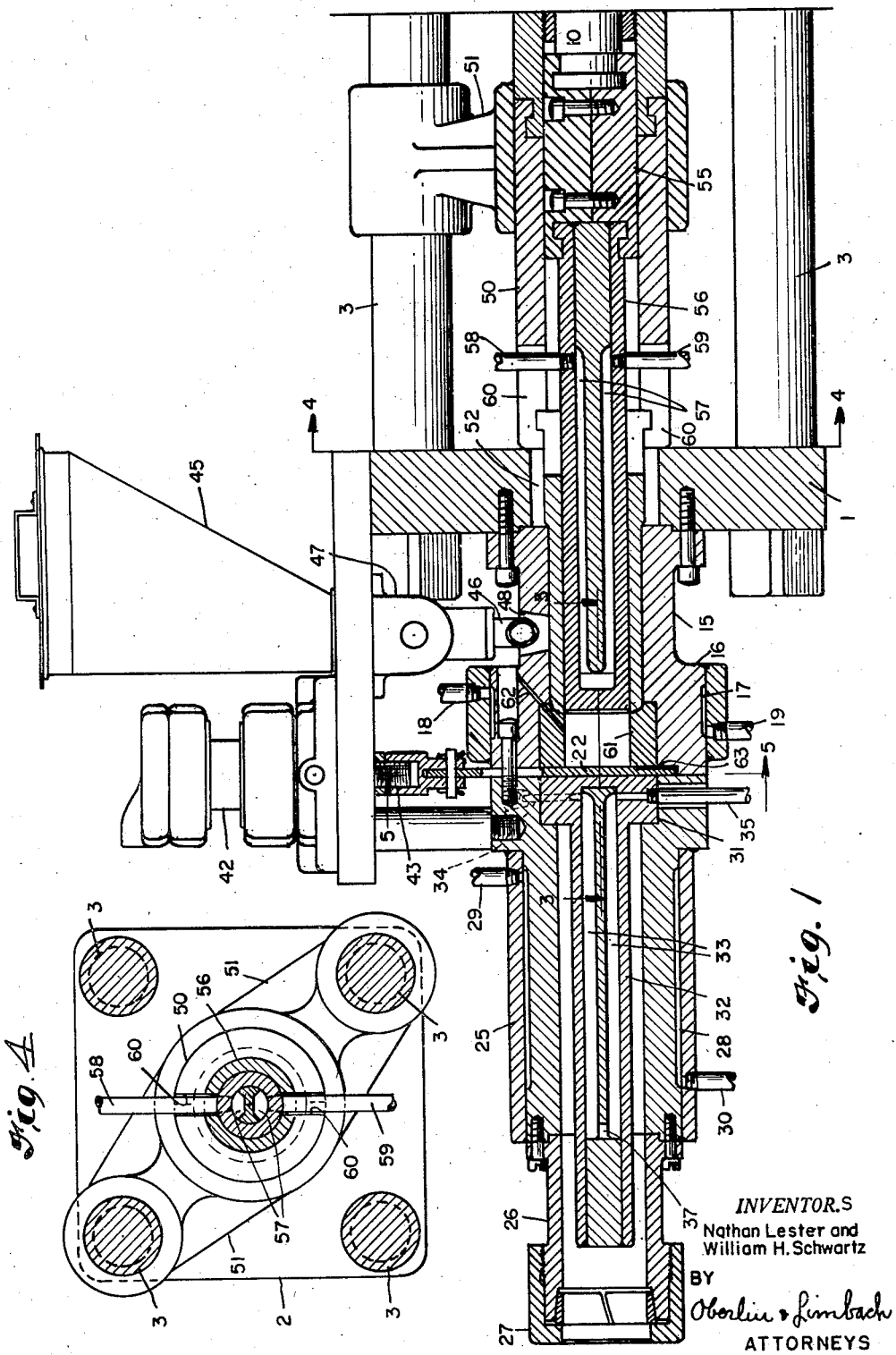
Fig. 1 is a longitudinal central view of the mold injection or discharge end of a machine embodying our present improvements.
Fig. 4 is a transverse sectional view taken on the plane indicated by the line 4—4 Fig. 1.

Referring to Figs. 1 and 2 which constitute, as stated, in effect a continuous central section of the machine taken on a vertical plane, it has been considered necessary for the purpose in hand to illustrate only those portions of the main frame which support the operative parts involved. The portions thus illustrated comprise two centrally apertured rectangular plates 1 and 2 which are held in spaced-apart relation by tie rods 3 shown as four in number. It has similarly been considered unnecessary to illustrate the mold into which the present mechanism is designed to inject the plastic material. Such mold will of course comprise separable sections to permit the ejection therefrom of the formed article, a typical construction being shown in the above cited Patent No. 2,243,968. Such mold will also of course have a sprue opening through which the plastic material is injected therein.

Extending longitudinally through the central apertures in supporting plates 1 and 2 is a sleeve-type plunger 5, the outer end of which is in the form of a piston 6 that is reciprocable in a cylinder 7 provided with fluid pressure supply and exhaust connections 8 and 9 to its respective ends. Reciprocable in turn within said sleeve-type plunger 5 is a solid plunger 10, the outer end of which extends through the head of cylinder 7 and is fitted with a piston 11 reciprocable within a second cylinder 12 aligned with said cylinder 7, and like it provided with fluid pressure supply and exhaust connections 13 and 14.

Bolted or otherwise securely fixed to the outer face of supporting plate 1 is an injection cylinder 15, the form of which is best shown in the broken perspective view of Fig. 6. As there shown (see also Fig. 1) this cylinder is provided at its outer end with an enlarged head 16 in which is formed a zig-zag encircling passage 17 for steam, hot water, or other heating fluid, supplied and exhausted therefrom respectively through connections 18 and 19. The forward face of head 16 is also provided with vertically aligned recesses 20 and 21 in which is fitted a vertically reciprocable slide 22 which is best shown in Fig. 5, and will be hereinafter described in further detail.

Secured to the head 16 of cylinder 15 is another cylinder 25 which constitutes in effect an extension of said first cylinder, and to the front end of said second cylinder is in turn secured a further cylindrical extension 26 that carries the injection nozzle 27 through which connection is had with the sprue opening of the mold. For the purpose of applying heat externally to cylinder 25 the wall of the latter is formed with an encircling space 28 with fluid inlet and exhaust connections 29 and 30 as shown in Fig. 1. Internal heating means are also provided within cylinder 25, such means comprising a disc-like head 31 that is clamped between head 16 of cylinder 15 and the adjacent end of cylinder 25, and a tubular extension 32 that is disposed centrally within the bore of said second cylinder. This extension is formed with a reverse passage 33 through which a heating medium may be circulated, such medium being supplied and exhausted through suitable connections 34 and 35 to the head 31. Such reverse passage 33 is conveniently formed in tubular extension 32 by fitting within the latter a rod-like element 36 (see Fig. 3) which is grooved on its opposite sides and has such grooves connected by a slot 37 at the outer end thereof.

The head 31 of tubular extension 32 is formed with two transverse passages 40 (see Fig. 3) which are adapted to provide communication between the hollow interior of cylinder 15 and the annular space left between said extension and the bore of the second cylinder 25. Gate 22 is provided with corresponding ports 41 which in the lowermost position of said gate will register with passages 40 but when said gate is raised will close said passages from communication with the interior of cylinder 15. Reciprocation of gate 22 is obtained by means of a piston (not shown) that is reciprocably held in a cylinder 42 supported above injection cylinder 15, the rod 43 of said piston having an adjustable connection with the upper end of the gate, as shown in Fig. 1.

Also (as shown in Fig. 1) there is supported above injection cylinder 15 a suitable hopper 45 or other source of supply for the dry, powdered or granular plastic material with which the machine is designed to operate. Such hopper has a discharge outlet 46 controlled by suitable measuring device (not shown) in its lower end 47, whereby at proper intervals measured quantities of the plastic material may be supplied to the hollow interior of injection cylinder 15 through an opening 48 in the upper wall thereof.

Returning now to the reciprocable sleeve-type plunger 5 and the solid plunger 10 reciprocably fitted therein, as shown in Fig. 1 the forward end of said first-named plunger terminates in a coupling 50 that is supported in a member 51 that extends between and is slidable upon two diagonally opposite rods 3 of the frame structure. Secured in turn to the forward end of coupling 50 is sleeve-like extension 52 that is reciprocably fitted in the main bore of injection cylinder 15. The sleeve-type plunger 5, as illustrated in Fig. 2, occupies its forward position and such sleeve-like extension 52 likewise occupies its forward position in which the opening 48 in the upper wall of injection cylinder 15 is closed off. However, upon retraction of plunger 5, said extension will be retracted to uncover the opening in question and thus permit a fresh charge of plastic material to enter the bore of said injection cylinder.

Lying within coupling 50 is a coupling 55 by means of which there is secured to the forward end of solid plunger 10 a tubular extension 56 that fits within the extension 52 coupled to the sleeve-type plunger 5. Said extension 56 is formed with a reverse passage 57 whereby the heating fluid may be circulated therethrough from inlet and exhaust connections 58 and 59, just as in the case of the extension 32 of head 31 which lies within cylinder 25. Indeed, as shown in Fig. 1, such circulating passage is provided by means of similar grooved rod. In order to permit relative reciprocation of extension 52 of the sleeve-type plunger 5 and this last-mentioned extension 56 of solid plunger 10, the coupling 50 which connects such first-mentioned extension with its plunger is provided with oppositely disposed slots 60 through which the connections 58 and 59 pass.

As stated, the extension 52 of the sleeve-type plunger is shown in its forward or advanced position in Fig. 1, in which position it substantially abuts against an annular member 61 that lines the forward portion of the bore of the injection cylinder 15. There will accordingly be a substantial space left between such end of extension 60 and the gate 22 which in its up position forms a closure for such space. One or more vent ducts 62 of small diameter are desirably provided, leading from the space in question to the exterior of cylinder 15 so as to permit the escape of air or other gases from the plastic material as it is collected, heated and compressed in such space. The gate 22 is also formed on its inner or rear face with a groove 63 which extends to its lower edge so as similarly to provide a vent in the raised position of said gate.

Extension 56 of solid plunger 10 is shown in Fig. 1 in its retracted position, corresponding with the retracted position of piston 11, which operates said plunger, as shown in Fig. 2. In this position the end of said extension stops a trifle short of the full forward position of the surrounding sleeve extension 52, so that an annular opening is provided through which plastic material, following its entry by way of opening 48 in the injection cylinder, may be forced into the space within member 61. However, when sleeve 52 is in its forward position, such space is closed off on its rear, i. e. right hand side as viewed in Fig. 1, and upon now advancing plunger extension 56 the material confined in such space may be subjected to a high degree of pressure. As a result, when the gate is depressed so as to bring the ports 41 therein in register with passages 40, the material will be forceably ejected into the annular space formed in the bore of cylinder 25 by the centrally projecting tubular member 32.

It will be understood of course that owing to the application of heat to the various plungers and other elements of the machine as previously described, the dry, powdered or granular plastic as it is fed into the space back of gate 22 will be brought to such degree of plasticity or fluidity as may be desired, and such state will be maintained or the fluidity or plasticity of the material increased by the heating means provided in connection with the cylindrical extension 25 which carries the discharge nozzle 27. Accordingly the material will be injected at exactly the right temperature, i. e. consistency, into the mold.

Having thus described the mechanical features which enter into our improved extrusion machine and their individual operation, the operation of the machine as a whole will now be set forth, by reference to Fig. 7 which shows diagrammatically the parts in question as well as the associated hydraulic or other pressure fluid lines as well as the electrical devices and connections whereby the several operations involved are properly correlated, adjusted and timed.

In the diagrammatic figure just referred to the pistons which operate the sleeve type plunger 5, solid plunger 10 and gate 22 are necessarily shown in disassociated relation instead of properly related as in the actual machine illustrated in Figs. 1 and 2. On the other hand, such diagrammatic drawing includes a showing of various stops and contacts associated with said pistons, or rather with the parts respectively actuated thereby, which serve to control such actuation and cause the same to follow in proper timed sequence.

The supply of pressure fluid, preferably oil, whereby the pistons in question are actuated is primarily controlled by solenoid controlled 4-way valves 65, 66 and 67 respectively connected with cylinders 7, 12 and 42 so that in one position of each valve such pressure fluid will be supplied to the one end of the corresponding cylinder and in another position of the valve will be supplied to the opposite end of the cylinder. Valve 66 utilizes a special spool construction whereby when the solenoids of the valve are deenergized the spool is shifted to a neutral position by a spring-centering arrangements. In such neutral position the ports which lead to the respective ends of cylinder 12 are both open to the port that leads to the pressure fluid storage tank while the port connected with branch supply line 68 is closed. The valves 65 and 67 are standard 4-way valves whose spool position when shifted to the right or the left by energization by the one solenoid or the other, is maintained even though both solenoids are deenergized. The oil or other pressure fluid is supplied to a main line 69 by a pump 70, such line including a relief valve 71 whereby the operating pressure of the pump is controlled. Provision is also made so that when the machine is running idle the fluid discharge supplied by pump 70 may be unloaded through said valve 71, this being accomplished by a solenoid-operated pilot valve 72. When the solenoid of this valve is energized its spool is shifted, allowing the fluid from the cap valve 71 to flow back to storage; and when this occurs the spool in the body of the latter lifts so as to allow the full volume of oil from the pump thus to be returned to storage.

Pressure fluid is supplied to cylinders 7 and 42 by a second branch 73 of the main line 69, such branch including a pressure reducing valve 74 so that said cylinders 7 and 42 may be operated at a substantially lower pressure than cylinder 12. For example, while the latter may be desirably operated under a maximum pressure of 2000 pounds per square inch, the maximum pressure under which the other two cylinders are operated may be 1000 pounds per square inch.

The electrical equipment utilized in conjunction with the foregoing hydraulic system includes first, a double throw, double pole switch 75 which controls the supply of current from leads 76 to the solenoid of valve 72. By closing this switch the flow of current to such solenoid will cause shifting of the valve's spool so as to vent the relief valve 71.

A second double throw, double pole switch 77 controls the flow of current from leads 76 to other switches of the machine circuit as follows:

Switches 78, 79 and 80 are double pole, single throw limit switches respectively actuated by the movement of adjustable stops on the piston rods of the pistons in cylinders 7, 12 and 42 respectively. As an example, when the piston of cylinder 7 is in its forward position, the stop which has tripped the roller and lever mechanism of switch 78 causes one set of contacts to close, and breaks the other, and at the end of the reverse movement of said pistons the opposite stop will trip such roller so as to reverse the open and closed position of its contacts. It will be understood that switches 79 and 80 are similarly operated by the stops carried by the piston rods of the pistons in the associated cylinders 12 and 42.

Switches 81, 82 and 83 are plunger-type limit switches of a single throw, single pole nature and said switches are respectively adapted to be operated by other stops on the piston rods of the pistons in cylinders 7, 12 and 42. By way of example, when the piston in said cylinder 7 is in its forward position, the corresponding stop will retain the contact of switch 81 closed, but upon completion of the reverse movement of said piston said switch will be actuated by suitable spring means to break such contact. The common contact of these switches 81, 82 and 83, when released, will break with one contact to the left and close with a contact to the right.

Supply of current to the several switches thus associated with cylinders 7, 12 and 42 is controlled by a timer 85 which includes a clutch coil and motor as indicated, together with appropriate contacts whereby said motor is set in motion and the circuits to the switches controlled as will now be conveniently explained by setting forth the cycle of operations of the machine as a whole.

For the purpose of this description it is assumed that the cycle starts with the pistons in cylinder 7 and 42 in their forward positions while the piston in cylinder 12 is in its retracted position. Thereupon the following movement of parts will follow, viz.: (1) the piston of cylinder 12 moves forward and completes its movement; (2) the piston in cylinder 7 retracts and completes its movement; (3) the piston in cylinder 42 retracts and completes its movement; (4) the piston in cylinder 7 moves forward; (5) an adjustable time delay period determined by the setting of device 85 thereupon follows; (6) the piston in cylinder 12 retracts and completes its movement; (7) the piston in cylinder 7 completes its forward movement; and (8) the piston in cylinder 42 moves forward and completes its movement. Upon completion of the foregoing cycle of movements such cycle will immediately repeat itself and the operation will thus continue unless and until the main control switch 77 is open.

As previously explained, the forward end of the solid plunger 10 in its retracted position lies just clear of the smaller bore in the injection cylinder so that an annular space is left through which communication is had with the larger bore in said cylinder wherein the tubular type plunger 5 reciprocates. When said last-named plunger is likewise retracted, the dry, powdered or granular plastic material discharged through the opening in the wall of the injection cylinder will more or less fill the space thus provided and upon forward movement of said tubular plunger such material will be forcefully injected into the smaller bore of the cylinder. When thereupon the solid plunger advances, such material will be confined in such bore until the gate 22 is raised so as to permit the material to be injected through the ports of the latter into the annular space in the cylinder extension that leads to the injection nozzle and so to the mold.

Means for effectively heating the material in each of these several stages of its transit through the mechanism are provided first by the circulation of heating fluid through the walls of the injection cylinder and such extension thereof, and subsequently by the means respectively provided for heating the forward end of the solid plunger and the forwardly projecting member within such extension.

The several parts of the apparatus, it will be noted, are so constructed that they may be readily separated when it is desired to take the mechanism apart. Thus by forming the solid and tubular plungers in two scetions which are coupled together at an intermediate point supported in a common slide it is rendered possible to get access to the injection mechanism proper without disassembling the hydraulic cylinders at the outer ends of said plungers whereby the latter are actuated.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In mechanism of the character described, the combination of an injection cylinder having a bore for the reception of plastic material, a gate controlling discharge of such material from such bore, a solid plunger reciprocable in such bore, and a tubular plunger surrounding said solid plunger and reciprocable in said cylinder towards and from such bore, said solid plunger in retracted position leaving an annular space through which plastic material may be supplied to such bore by reciprocation of said tubular plunger, such bore including a vent duct for permitting escape of gas from the material supplied to such bore.

2. In mechanism of the character described, the combination of an injection cylinder having a bore for the reception of plastic material, a gate controlling discharge of such material from such bore, a solid plunger reciprocable in such bore, a tubular plunger surrounding said solid plunger and reciprocable in said cylinder towards and from such bore, said solid plunger in retracted position leaving an annular space through which plastic material may be supplied to such bore by reciprocation of said tubular plunger, said gate having vent means operative when said gate is in position closing such bore for permitting escape of gas from the material supplied to such bore.

3. In mechanism of the character described, the combination of an injection cylinder having a bore for the reception of plastic material, an extension secured to said injection cylinder and defining therewith a transverse recess, a gate movable in such recess controlling passage of such material from such bore into said extension, a solid plunger reciprocable in such bore, a tubular plunger surrounding said solid plunger and reciprocable in said cylinder towards and from such bore, said solid plunger in retracted position leaving an annular space through which plastic material may be supplied to such bore by reciprocation of said tubular plunger, said gate defining with such recess vent means operative only when said gate is in position closing such bore for permitting escape of gas from the material supplied to such bore.

4. In mechanism of the character described, the combination of an injection cylinder having a bore for the reception of plastic material and an adjacent coaxial bore of larger diameter, means for supplying material to such second bore, a solid plunger reciprocable into and out of such first bore, a tubular plunger surrounding said solid plunger and reciprocable in such second bore, said solid plunger in retracted position leaving an annular space through which material may be supplied to such first bore by reciprocation of said tubular plunger, said tubular plunger being formed with an end face complementary with that joining such bores and engageable therewith upon reciprocation of said tubular plunger to thus expel from such second bore all of the material supplied thereto, said tubular plunger when such end face thereof is engaged with that joining such bores forming a contiguous extension of such first bore in which said solid plunger is reciprocable.

5. In mechanism of the character described, the combination of an injection cylinder having a bore for the reception of plastic material and an adjacent coaxial bore of larger diameter, means for supplying material to such second bore, a solid plunger reciprocable into and out of such first bore, a tubular plunger surrounding said solid plunger and reciprocable in such second bore, said solid plunger in retracted position leaving an annular space through which material may be supplied to such first bore by reciprocation of said tubular plunger, means associated with said plungers for retracting said tubular plunger upon completion of the forward movement of said solid plunger into such first bore, time delay means responsive to retraction of said tubular plunger for first effecting forward movement of said tubular plunger while said solid plunger is retained in a forward position in such first bore and then after the lapse of a period of time as determined by said time delay means retracting said solid plunger to permit said tubular plunger to continue its forward movement for supplying material to such first bore, and other means associated with said plungers for initiating forward movement of said solid plunger into such first bore upon completion of the forward movement of said tubular plunger.

6. In mechanism of the character described, the combination of an injection cylinder having a bore for the reception of plastic material and an adjacent coaxial bore of larger diameter, means for supplying material to such second bore, a solid plunger reciprocable into and out of such first bore, a tubular plunger surrounding said solid plunger and reciprocable in such second bore, said solid plunger in retracted position leaving an annular space through which material may be supplied to such first bore by reciprocation of said tubular plunger, means associated with said plungers for retracting said tubular plunger upon completion of the forward movement of said solid plunger into such bore, a timing device associated with said plungers set in operation by retracting of said tubular plunger, said timing device when so set in operation being operative to cause said tubular plunger to move forward while said solid plunger is retained in a forward position in such first bore, said timing device after a lapse of a period of time as determined by said timing device being operative to cause retracting of said solid plunger from such first bore to thus permit said tubular plunger to continue its forward movement for supplying material to such first bore, and other means associated with said plungers for initiating forward movement of said solid plunger into such first bore upon completion of the forward movement of said tubular plunger.

7. In mechanism of the character described, the combination of an injection cylinder having a bore for the reception of plastic material and an adjacent coaxial bore of larger diameter, means for supplying material to such second bore, a solid plunger reciprocable into and out of such first bore, a tubular plunger surrounding said solid plunger and reciprocable in such second bore, said solid plunger in retracted position leaving an annular space through which material may be supplied to such first bore by reciprocation of said tubular plunger, independent fluid pressure actuating means each including a movable element connected to one of said plungers for reciprocating the latter, an electrically operated valve associated with each of said means selectively operable to move the corresponding movable element in opposite directions, a pair of switches associated with each of said plungers operable to control said plungers through said valves and fluid pressure actuating means, a timing device interposed between one of the switches of each pair of switches, said pairs of switches and said timing device being so interconnected that movement of said solid plunger into such first bore actuates the pair of switches associated with said solid plunger to stop said solid plunger and retract said tubular plunger through one of the pair of switches associated with the latter and to condition said solid plunger for retraction from such first bore, and that such retraction of said tubular plunger actuates one of the pair of switches associated therewith to set said timing device in operation, said timing device including a switch element which when said timing device is set in operation is operative through one of the pair of switches associated with said tubular plunger to move said tubular plunger in a forward direction and which element when said timing operation is complete is operative through that switch associated with said solid plunger which conditions said solid plunger for retraction movement from such first bore to so retract said solid plunger, such retracting of said solid plunger permitting continued forward movement of said tubular plunger for supplying material to such first bore, said tubular plunger upon completing its forward movement actuating the pair of switches associated therewith to move said solid plunger forward through one of the pair of switches associated with the latter and to condition said tubular plunger for retraction movement upon completion of the forward movement of said solid plunger.

8. In mechanism of the character described, the combination of an injection cylinder having a bore for the reception of plastic material and an adjacent coaxial bore of larger diameter, means for supplying material to such second bore, a solid plunger reciprocable into and out of such first bore, a tubular plunger surrounding said solid plunger and reciprocable in such second bore, said solid plunger in retracted position leaving an annular space through which material may be supplied to such first bore by reciprocation of said tubular plunger, a gate controlling discharge of material from such first bore, means associated with said plungers and gate for successively retracting said tubular plunger and actuating said gate to a position preventing discharge of material from such first bore upon completion of the forward movement of said solid plunger into such first bore, time delay means responsive to retraction of said tubular plunger and movement of said gate as aforesaid for first effecting forward movement of said tubular plunger while said solid plunger is retained in a forward position in such first bore and then after the lapse of a period of time as determined by said time delay means retracting said plunger to permit said tubular plunger to continue its forward movement to supply material to such first bore, and other means associated with said plungers and gate for simultaneously initiating forward movement of such solid plunger into such first bore and actuation of such gate into a position permitting discharge of such material from such first bore in response to completion of the forward movement of said tubular plunger.

9. In mechanism of the character described, the combination of an injection cylinder having a bore for the reception of plastic material and an adjacent coaxial bore of larger diameter, means for supplying material to such second bore, a solid plunger reciprocable into and out of such first bore, a tubular plunger surrounding said solid plunger and reciprocable in such second bore, said solid plunger in retracted position leaving an annular space through which material may be supplied to such first bore by reciprocation of said tubular plunger, a gate controlling discharge of material from such first bore, means associated with said plungers and gate for successively retracting said tubular plunger and actuating said gate to a position preventing discharge of material from such first bore upon completion of the forward movement of said solid plunger into such first bore, a timing device associated with said plungers and gate set in operation by retracting of said tubular plunger and movement of said gate as aforesaid, said timing device when so set in operation being operative to cause said tubular plunger to move forward while said solid plunger is retained in a forward position in such first bore and said gate is retained in the aforesaid position, said timing device after the lapse of a period of time as determined by said timing device being operative to cause retraction of said solid plunger from such first bore to thus permit said tubular plunger to continue its forward movement to supply material to such first bore, and other means associated with said plungers and gate for simultaneously initiating forward movement of said solid plunger into such first bore and actuation of said gate to a position permitting discharge of material from such first bore upon completion of the forward movement of said tubular plunger.

10. In mechanism of the character described, the combination of an injection cylinder having a bore for the reception of plastic material and an adjacent coaxial bore of larger diameter, means for supplying material to such second bore, a solid plunger reciprocable into and out of such first bore, a tubular plunger surrounding said solid plunger and reciprocable in such second bore, said solid plunger in retracted position leaving an annular space through which material may be supplied to such first bore by reciprocation of said tubular plunger, a gate controlling discharge of material from such first bore, independent fluid pressure actuating means each including a movable element connected to one of said plungers and to said gate for reciprocating the former and for actuating the latter between positions preventing and permitting discharge of material from such first bore, an electrically operated valve associated with each of said plungers and said gate selectively operable to move the corresponding movable element in opposite directions, a pair of switches associated with each of said plungers and gate operable to control said plungers and gate through said fluid pressure actuating means and said valves, a timing device interposed between one of the switches of the pair of switches associated with said solid plunger and said gate, said pairs of switches and said timing device being so interconnected that movement of said solid plunger into such first bore actuates the pair of switches associated with said solid plunger to stop said solid plunger, retract said tubular plunger through one of the pair of switches associated with the latter, and to condition said solid plunger for retraction from such first bore, and that such retraction of said tubular plunger actuates one of the pair of switches associated therewith to actuate said gate through one of the pair of switches associated with the latter from a position permitting discharge of material from such first bore to a position preventing discharge of material from such first bore, such actuation of said gate actuating one of the pair of switches associated therewith to set said timing device in operation, said timing device including a switch element which when said timing device is set in operation is operative through one of the pair of switches associated with said gate to move said tubular plunger in a forward direction and which element when said timing operation is complete is operative through that switch associated with said solid plunger which conditions said solid plunger for retraction movement from such first bore to so retract said solid plunger, such retraction of said solid plunger permitting continued forward movement of said tubular plunger and supplying of material to such first bore, said tubular plunger upon completing its forward movement actuating the pair of switches associated therewith to simultaneously move said solid plunger forward through one of the pair of switches associated with the latter and actuate said gate through one of the switches associated with the latter to a position permitting discharge of material from such first bore, and to condition said tubular plunger for retraction movement upon completion of the forward movement of said solid plunger.

NATHAN LESTER.
WILLIAM H. SCHWARTZ.

REFERENCES CITED

The following references are of record in the file of this patent:

UNITED STATES PATENTS

| Number | Name | Date |
| --- | --- | --- |
| 1,961,941 | Pack | June 5, 1934 |
| 2,209,608 | Nye et al. | July 30, 1940 |
| 2,253,460 | Hempel | Aug. 19, 1941 |
| 2,312,726 | Munro | Mar. 2, 1943 |
| 2,318,031 | Tucker | May 4, 1943 |
| 2,363,196 | Nye | Nov. 21, 1944 |
| 2,366,417 | MacMillin | Jan. 2, 1945 |
| 2,386,966 | MacMillin | Oct. 16, 1945 |

FOREIGN PATENTS

| Number | Country | Date |
| --- | --- | --- |
| 501,277 | Great Britain | Feb. 21, 1939 |